C. SOTTON.
LINEAR GAGE.
APPLICATION FILED JULY 7, 1913.
1,124,670.
Patented Jan. 12, 1915.
2 SHEETS—SHEET 1.
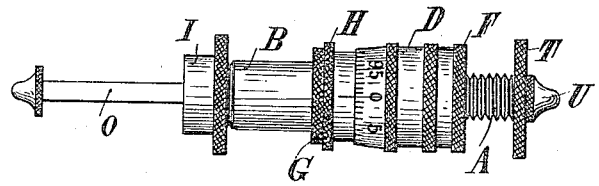
Fig. 1.
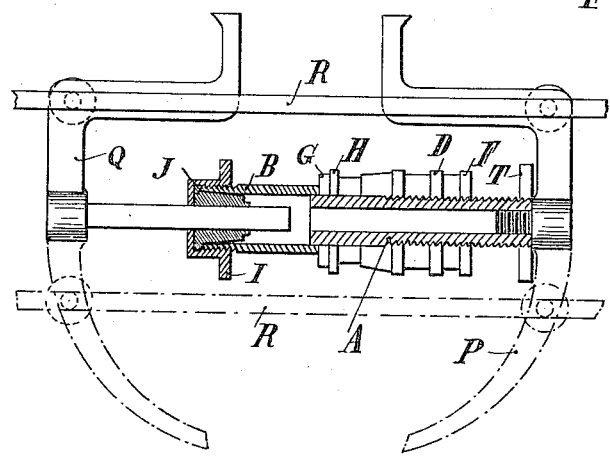
Fig. 2.
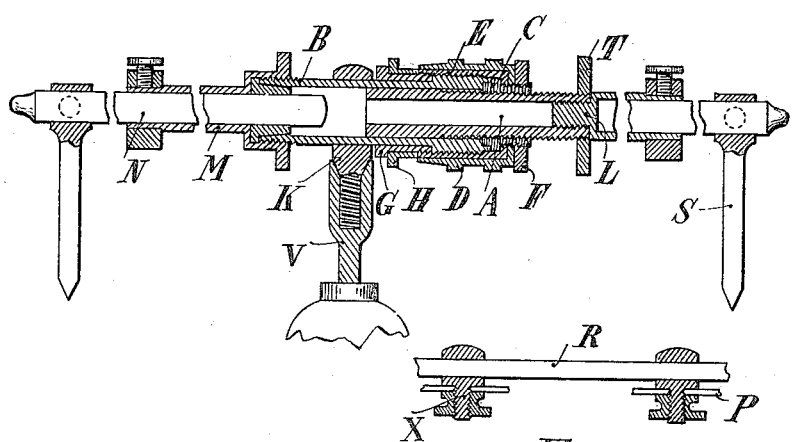
Fig. 3.
Fig. 4.
Witnesses:
Burk R. Newcomb
M. Roche
Inventor:
Claude Sotton
by B. Singer
Atty

C. SOTTON.
LINEAR GAGE.
APPLICATION FILED JULY 7, 1913.

1,124,670.

Patented Jan. 12, 1915.

2 SHEETS—SHEET 2.

UNITED STATES PATENT OFFICE.

CLAUDE SOTTON, OF ROMAINVILLE, FRANCE.

LINEAR GAGE.

1,124,670.   Specification of Letters Patent.   Patented Jan. 12, 1915.

Application filed July 7, 1913. Serial No. 777,710.

*To all whom it may concern:*

Be it known that I, CLAUDE SOTTON, a citizen of the Republic of France, residing at Romainville, France, have invented certain new and useful Improvements in Linear Gages, of which the following is a full, clear, and exact specification.

This invention has reference to linear gages and the like, of the kind in which various prolongations on the ends of a cylinder and piston are adapted to be moved either inward or outward in such a manner that the length between the said prolongations can be read from graduations on the knurled socket upon the said cylinder and piston.

The object of the present invention is to provide an improved gage of this kind in which the prolongations can be slidably moved inward or outward by the rotation of a nut or washer so that a hundredth part of a millimeter can be read.

With this object in view the invention consists in the construction and novel combination of parts hereinafter fully described and pointed out more particularly in the claim hereto appended.

I will now describe my invention with reference to the accompanying drawings in which:—

Figure 5:
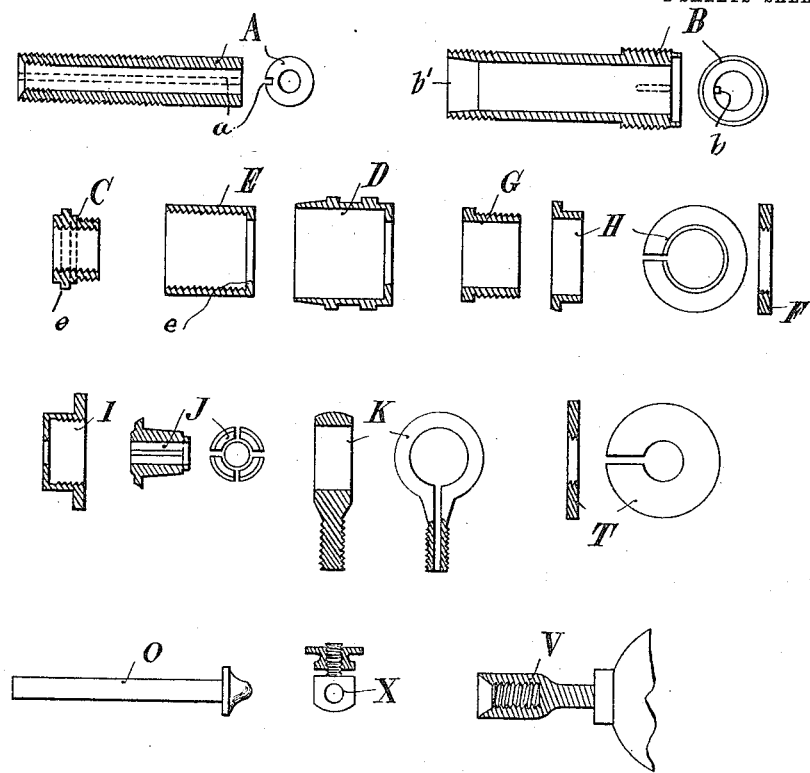
Figure 5:
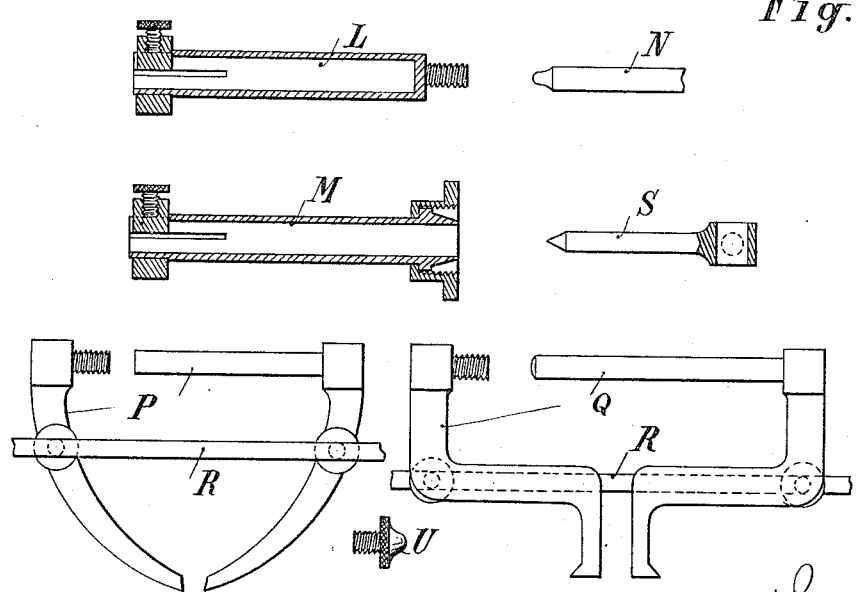

Figure 1 shows in elevation the apparatus mounted with two simple prolongations of known type. Fig. 2 shows the apparatus in part section with two kinds of caliper branches, interior and exterior, and shows how these branches are fastened into the ends thereof. Fig. 3 shows the apparatus in section with several prolongations, the tracing points S and its holding link and sleeve. Fig. 4 is a sectional side view and shows how the slide R is mounted. Fig. 5 shows in detail the various parts of the gage.

A piston A having a screw-thread with a pitch of 1 mm. is provided with a longitudinal groove $a$ and slides in a cylinder B. A nut C mounted on the screw threaded end of the piston A causes this cylinder to slide and this nut is operated by means of a threaded and knurled ring or washer F which tightly holds the knurled socket D marked with circular graduations (100 equal parts) against rotation. The nut C is held adjacent to the cylinder by a threaded socket E by means of an internal flange $e$ engaging the enlarged portion $c$ of the nut. This interiorly threaded socket E receives at its end an exteriorly threaded ring G which with its head flange tightly surrounds the cylinder B thus permitting the cylinder to be moved and carried along when the nut C is rotated by the washer F which is tightly screwed on the end thereof. A split ring H is rotatable on the ring G to permit of its indicating mark engraved thereon always being brought in front of the zero of the graduated scale D. The piston A slides in the cylinder B which has an inner stud $b$ and a conical boring $b^1$ at one extremity which is adapted to receive branches and prolongations of various kinds such as M, O, P, Q, being fastened individually by a nut I screwing on the threaded end of the cylinder B and an expanding ring J in the conical bore. The prolongations L, M are adapted to receive other prolongations N of any length.

The branches of the apparatus are all provided with a slide R guided by the parts X fastened to the branches by means of a knurled nut permitting the branches to be kept rigid and always in the same plane. Points S may be mounted on the prolongations N, and form a beam compass which is absolutely adjustable. A link K tightened by a sleeve V on a smooth portion of the cylinder B permits of holding the apparatus in any direction. A split washer T is mounted on the piston A and acts as a stop to prevent the rotatable parts being moved into contact with the prolongations or branches.

I claim:

A linear gage or the like comprising a threaded piston having a longitudinal groove, a cylinder slidable on said piston, a threaded nut adapted to rotate on the piston, a socket engaging said nut and threaded on the cylinder, a ring on said cylinder engaging said socket, an adjustable split ring mounted on the said ring and having an indicating mark, a knurled socket upon said piston having circular graduations, a washer on the nut and means on the outer ends of the piston and the cylinder adapted to receive prolongations and branches of various kinds, substantially as described.

In testimony whereof I affix my signature in presence of two witnesses.

CLAUDE SOTTON.

Witnesses:
 VICTOR PRÉVOST,
 LUCIEN MEMMINGER.